US012502952B2

(12) United States Patent
Kiyooka (10) Patent No.: US 12,502,952 B2
(45) Date of Patent: Dec. 23, 2025

(54) VEHICLE POWER TRANSMISSION UNIT (71) Applicant: KANZAKI KOKYUKOKI MFG. CO., LTD., Amagasaki (JP)

(72) Inventor: Koji Kiyooka, Amagasaki (JP)

(73) Assignee: KANZAKI KOKYUKOKI MFG. CO., LTD., Amagasaki (JP)

( * ) Notice: Subject to any disclaimer, the term of this patent is extended or adjusted under 35 U.S.C. 154(b) by 0 days.

(21) Appl. No.: 18/883,564

(22) Filed: Sep. 12, 2024

(65) Prior Publication Data

US 2025/0091431 A1 Mar. 20, 2025

(30) Foreign Application Priority Data

Sep. 14, 2023 (JP) .................................. 2023-148884

(51) Int. Cl.
*F16D 11/14* (2006.01)
*B60K 17/02* (2006.01)
*B62D 11/04* (2006.01)
*F16D 67/02* (2006.01)
*F16H 63/34* (2006.01)

(52) U.S. Cl.
CPC .............. *B60K 17/02* (2013.01); *B62D 11/04* (2013.01); *F16D 67/02* (2013.01); *F16D 11/14* (2013.01); *F16H 63/34* (2013.01)

(58) Field of Classification Search
CPC ....... F16H 63/3416–3483; F16D 11/14; F16D 67/02–06; F16D 2011/002
See application file for complete search history.

(56) References Cited

U.S. PATENT DOCUMENTS

| | | | | |
|---|---|---|---|---|
| 2002/0028721 | A1* | 3/2002 | Inoue ..................... | B60K 17/16 475/198 |
| 2006/0219495 | A1* | 10/2006 | Schlosser ................ | F16D 67/02 188/84 |
| 2009/0069964 | A1 | 3/2009 | Wyatt et al. | |
| 2020/0393019 | A1* | 12/2020 | Matsunaga ............ | H02K 7/112 |
| 2022/0272896 | A1* | 9/2022 | Kiyooka ................ | A01D 34/64 |

FOREIGN PATENT DOCUMENTS

JP 2014117026 A 6/2014

\* cited by examiner

*Primary Examiner* — Ernesto A Suarez
*Assistant Examiner* — Lillian T Nguyen
(74) *Attorney, Agent, or Firm* — CANTOR COLBURN LLP (57) ABSTRACT

[Problem] To provide a vehicle power transmission unit capable of moving a vehicle with a small power when a power supply of a system is off and capable of braking the vehicle by a brake system regardless of whether a clutch is engaged or disengaged. [Solution] A power transmission unit includes an input shaft, a gear mechanism, and an axle. Power from a power source is transmitted from a rotational shaft of the power source to the axle via the input shaft and a gear mechanism. The rotational shaft and the input shaft are arranged such that axes thereof match each other. The power transmission unit further includes: a clutch provided between the rotational shaft and the input shaft and manually operated to switch engagement and disengagement between the rotational shaft and the input shaft; a brake mechanism including a brake rotor provided not to rotate relative to the input shaft.

3 Claims, 9 Drawing Sheets

FIG. 8A (CLUTCH DISENGAGED STATE)

FIG. 8B (CLUTCH ENGAGED STATE)

VEHICLE POWER TRANSMISSION UNIT

CROSS REFERENCE TO RELATED APPLICATIONS

The present invention claims priority under 35 U.S.C. § 119 to Japanese Application No. 2023-148884, filed on Sep. 14, 2023, the entire c ontents of which being incorporated herein by reference.

TECHNICAL FIELD

The present invention relates to a vehicle power transmission unit.

BACKGROUND ART

Conventionally, vehicles, such as lawn mowing vehicles, capable of traveling by driving wheels by an electric motor have been known. The lawn mowing vehicles each include a work unit such as a lawn mower. A lawn mowing vehicle in which left and right wheels are driven by a common electric motor is described in Patent Document 1. In Patent Document 2, the following lawn mowing vehicle is described. In the lawn mowing vehicle, left and right wheels can be driven in a mutually independent manner, the left wheels are driven by a left electric motor, and the right wheels are driven by a right electric motor.

PRIOR ART DOCUMENT

Patent Document

Patent Document 1: U.S. Unexamined Patent Application Publication No. 2009/0069964
Patent Document 2: Japanese Unexamined Patent Application Publication No. 2014-117026

SUMMARY OF INVENTION

Technical Problem

In the vehicle in which the left and right wheels are driven by one or two motors as described above, a power transmission unit is used to transmit power of the electric motor to the wheels. In regard to this power transmission unit, it is considered to provide a brake rotor to a gear mechanism as a power transmission member from the electric motor to an axle and sandwich the brake rotor with friction materials, which are pressing sections such as brake pads, from both sides to brake the wheels. In this case, it is also considered to use, instead of the electric motor, another power source such as an engine or a hydraulic motor in the power transmission unit.

By the way, there is a market demand for a vehicle as follows. Even in the case where the power source generates high stationary torque, such as a case where the electric motor generates high cogging torque, when a system power supply of the vehicle is off, it is desired to move the vehicle with a small force by towing or the like. For such a purpose, it is considered to provide a dog clutch, which is referred to as a towing clutch capable of allowing or canceling power transmission, between the axle and the gear mechanism. However, in this case, when the vehicle starts moving from a clutch disengaged position on an inclined road surface due to own weight, an operation of the brake system may be insufficient to brake the vehicle without engagement of the clutch.

An object of the present invention is to provide a vehicle power transmission unit capable of moving a vehicle with a small force when a system power supply is off and capable of braking the vehicle by a brake system regardless of engagement or disengagement of a clutch.

Solution to Problem

A vehicle power transmission unit according to the present invention is a vehicle power transmission unit that includes an input shaft, a gear mechanism, and an axle and in which power from a power source is sequentially transmitted from a rotational shaft of the power source to the input shaft, the gear mechanism, and the axle. The vehicle power transmission unit includes: a brake mechanism in which an input gear section provided on the input shaft meshes with the gear mechanism, in which an axle gear section provided on the axle meshes with the gear mechanism, in which the rotational shaft and the input shaft are arranged such that axes thereof match each other, and which includes a brake rotor provided not to rotate relative to the input shaft; and a clutch that is provided between the rotational shaft and the input shaft and can be operated manually to switch engagement and disengagement between the rotational shaft and the input shaft.

Advantageous Effects of Invention

According to the vehicle power transmission unit in the present invention, the vehicle can be moved with a small force due to the disengagement of the clutch when a system power supply is off, and the vehicle can be braked by a brake system that includes a brake mechanism acting on the axle regardless of the engagement or the disengagement of the clutch.

DESCRIPTION OF EMBODIMENTS

Hereinafter, an embodiment of the present invention is described in detail with reference to the drawings. Hereinafter, a case where a vehicle power transmission unit is mounted on a lawn mowing vehicle as a work vehicle is described. However, a vehicle on which the vehicle power transmission unit is mounted is not limited thereto and may be another work vehicle having a working unit for performing at least one of snow removal work, excavation work, construction work, and agricultural work, an off-road utility vehicle having a luggage carrier and traveling on an uneven terrain, an all-terrain vehicle (ATV), a recreational vehicle (RV), or a recreational off-highway vehicle (ROV). In addition, a case where two rear wheels of the vehicle are driven by two motors is described below. However, the vehicle may be configured that two front wheels are driven by the two motors. Furthermore, hereinafter, an example in which a vehicle speed change instruction in a forward-reverse travel direction and a turning instruction are made by an operation of each of two left and right operation levers is described. However, this is merely illustrative. A steering wheel may be used as a turning instruction tool, and a seesaw acceleration/deceleration pedal provided on a floor in front of a seat may be used as a speed change instruction tool in the forward-reverse travel direction. Hereinafter, the same elements in the drawings are denoted by the same reference signs, and the overlapping description thereon is omitted or simplified.

In the drawings described below, a front-rear direction is denoted by X, a left-right direction is denoted by Y, and an up-down direction is denoted by Z. In addition, a front side is denoted by Fr, a left side is denoted by Lh, and an upper side is denoted by Up. The directions X, Y, Z are orthogonal to each other.

Figure 1:
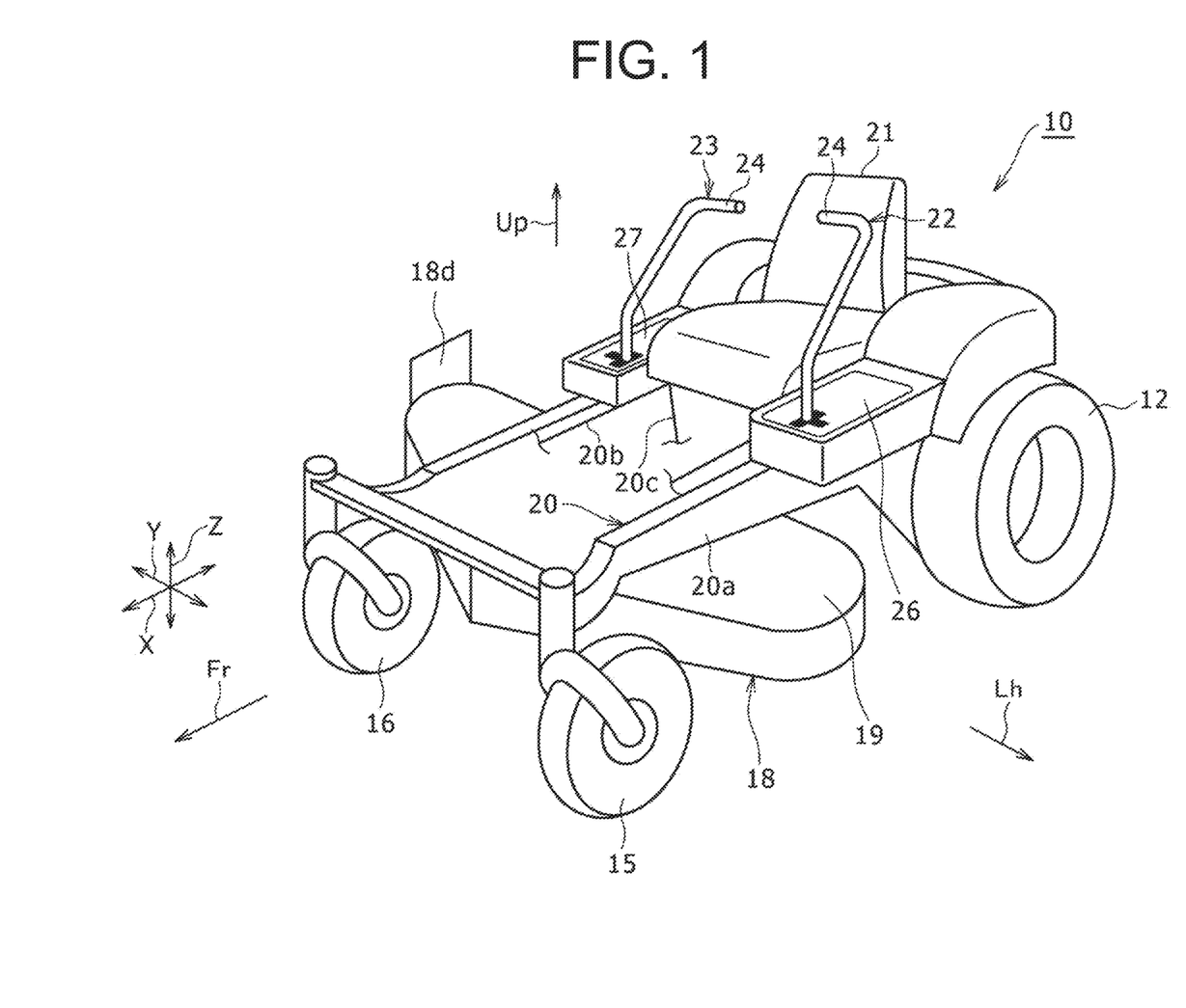
FIG. 1 is a perspective view of a vehicle on which a vehicle power transmission unit in an embodiment according to the present invention is mounted.
Figure 2:
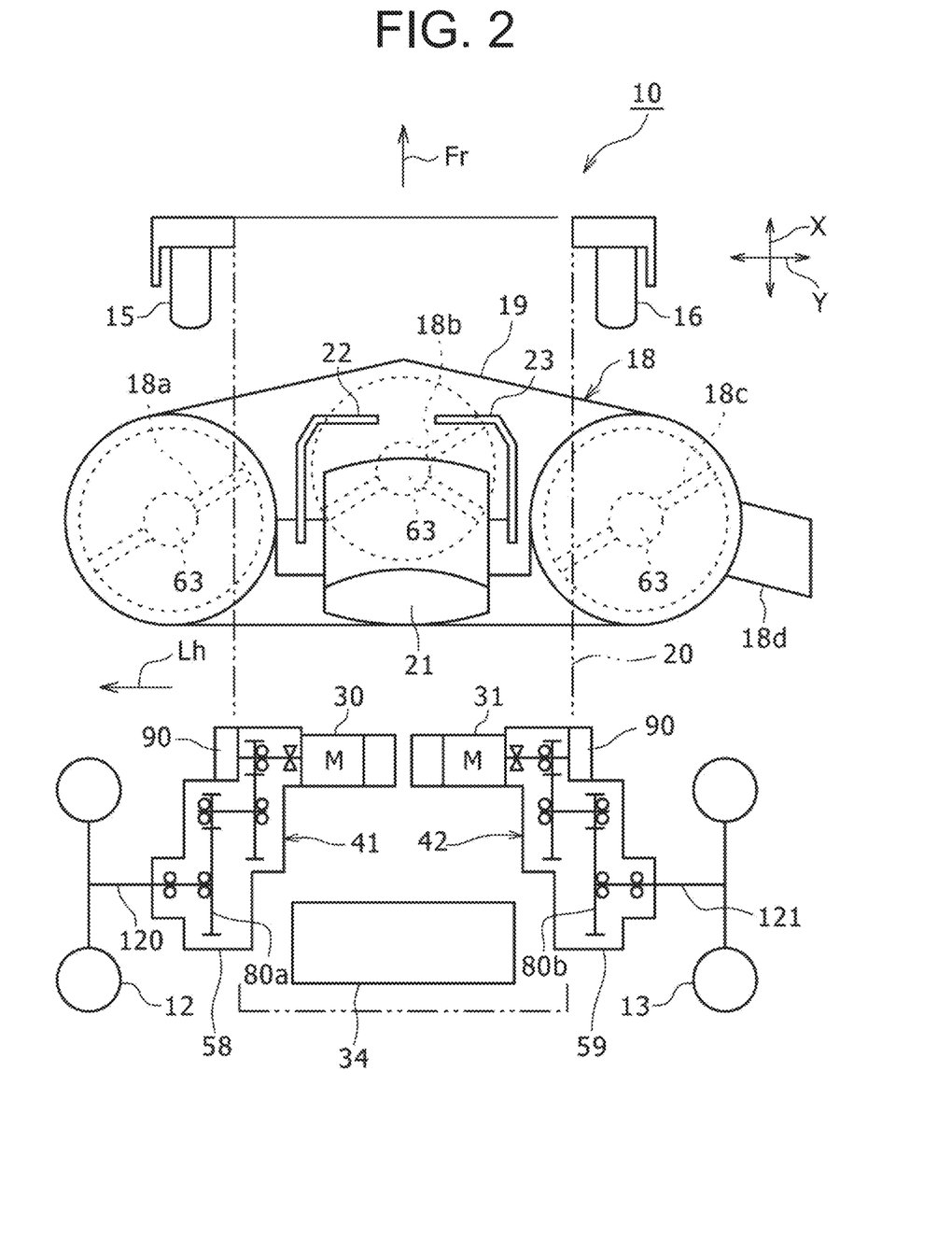
FIG. 2 is a schematic configuration view of the vehicle in FIG. 1 that is seen from above.

FIG. 1 is a perspective view of a vehicle 10 to which a vehicle power transmission unit of the embodiment is assembled. FIG. 2 is a schematic configuration view of the vehicle 10. In the following description, the vehicle power transmission unit is referred to as a power transmission unit. The vehicle 10 is a lawn mowing vehicle of a passenger self-propelled type suitable for lawn mowing work. The vehicle 10 includes: two left and right wheels that are a left wheel 12 and a right wheel 13 (FIG. 2); two left and right front wheels that are caster wheels 15, 16; a lawn mower 18 as a working unit; and a left travel motor 30 and a right travel motor 31 (FIG. 2). The vehicle 10 also includes three deck motors 63 (FIG. 2) as work motors, two left and right operation levers 22, 23, a battery 34 (FIG. 2), and a controller (not illustrated). Each of the left travel motor 30, the right travel motor 31, and the deck motors 63 is an electric motor. The left travel motor 30 and the right travel motor 31 each correspond to the power supply in the present invention.

The left wheel 12 and the right wheel 13 are rear wheels that are supported on left and right sides of a rear portion of a main frame 20 as a vehicle body via the power transmission unit and are main drive wheels. The main frame 20 is formed of metal such as stainless steel to have a beam structure or the like. The main frame 20 includes: side plates 20a, 20b that extend substantially in the front-rear direction at both left and right ends; and a coupling section 20c that couples the side plates 20a, 20b on both of the left and right sides. A seat 21 on which a driver as a user is seated is fixed to an upper side between rear end portions of the left and right side plates 20a, 20b.

The left and right operation levers 22, 23 are separately arranged at left and right positions on a floor in a manner to sandwich the seat 21 and are each used to instruct a rotational direction and a rotational speed of respective one of the left wheel 12 and the right wheel 13 by movement in the front-rear direction. More specifically, in the main frame 20, lever guides 26, 27 are respectively fixed to the left and right sides of the seat 21 and are supported on the main frame 20 such that the operation levers 22, 23 respectively project upward from the lever guides 26, 27.

The left operation lever 22 corresponds to a travel instruction tool for instructing acceleration/deceleration, stop, and normal/reverse rotation of the left travel motor 30, and the right operation lever 23 corresponds to a travel instruction tool for instructing acceleration/deceleration, stop, and normal/reverse rotation of the right travel motor 31. Each of the operation levers 22, 23 is operated by the driver to be tilted in the front-rear direction. The left operation lever 22 is tilted to instruct a driving direction, a speed, and stop of the left wheel 12. The right operation lever 23 is tilted to instruct acceleration/deceleration, stop, and normal/reverse rotation of the right wheel 13. Each of the operation levers 22, 23 is substantially L-shaped and is formed with a grip section 24, which extends in the left-right direction, in an upper end portion. The grip section 24 is gripped and operated by the driver.

A lower end portion of each of the operation levers 22, 23 is supported by the main frame 20 to be swingable in the front-rear direction with an axis in the left-right direction being a center. In addition, each of the operation levers 22, 23 is urged toward an N position, which is a neutral position close to an upright position, by a spring. When being tilted forward against urging by the spring with this N position being a reference, the operation lever 22 (or 23) instructs to drive the travel motor 30 (or 31) on the same side at a target rotational frequency per unit time (sec-1), which is a target rotational speed corresponding to the forward travel. As the target rotational speed, a target rotational frequency per minute (min-1) may be set.

The operation levers 22, 23 instruct to increase the target rotational frequency as a tilt amount (angle) is increased with reference to the N position. When being tilted rearward with reference to N position, the operation levers 22, 23 each instruct to drive the travel motor 30 (or 31) on the same side as the operation lever 22 (or 23) at the target rotational frequency corresponding to reverse travel, which increases the target rotational frequency as the tilt amount is increased. When being moved to the N position, the operation levers 22, 23 each instruct to stop driving the travel motor 30 (or 31) on the same side as the operation lever 22 (or 23). With the user's operation, the operation levers 22, 23 each instruct the target rotational frequency of respective one of the travel motors 30, 31 for the forward travel, the reverse travel, or the stop of the vehicle.

Tilted positions of the two left and right operation levers 22, 23 in the front-rear direction are detected by left and right lever position sensors (not illustrated), respectively. Each of the lever sensors includes a potentiometer, for example. A detection signal of each of the lever sensors is transmitted to the controller.

The two left and right caster wheels 15, 16 are supported on a front end portion of the main frame 20 and are respectively provided in front of and away from the left wheel 12 and the right wheel 13 in the front-rear direction of the vehicle 10. The caster wheels 15, 16 are configured to be freely turnable at 360 degrees or more about an axis extending in a vertical direction (the up-down direction in FIG. 1) according to driven states of the left wheel 12 and the right wheel 13, respectively, and thereby assists with travel. Here, the caster wheels are not limited to have the configuration in which the two thereof are arranged in the vehicle. Only one or three or more of the caster wheels may be arranged in the vehicle.

As illustrated in FIG. 2, the left travel motor 30 is a power source of a left power transmission unit 41 that is supported on a rear portion of the main frame 20 and is drivingly connected to the left wheel 12 via a gear mechanism 80a included in this unit and a left axle 120. The right travel motor 31 is a power source of a right power transmission unit 41 that is supported on the rear portion of the main frame 20 and is drivingly connected to the right wheel 13 via a gear mechanism 80b included in this unit and a right axle 121. In the rear portion of the main frame 20, the left travel motor 30 and the right travel motor 31 are respectively supported on the left side and the right side either directly or indirectly. Travel inverters, each of which is electrically connected to respective one of the left travel motor 30 and the right travel motor 31, receive a signal corresponding to respective one of the operation levers 22, 23 via the controller. Thus, the two left and right travel motors 30, 31 can respectively drive the two left and right wheels 12, 13 in a mutually independent manner.

The battery 34 (FIG. 2) is electrically connected to the left travel motor 30 via the travel inverter (not illustrated), and electric power is supplied from the battery 34. The battery 34 is electrically connected to the right travel motor 31 via the right travel inverter (not illustrated), and the electric power is supplied from the battery 34. Each of the left travel motor 30 and the right travel motor 31 is a three-phase motor, for example. As illustrated in FIG. 2, at a position behind the seat 21, the battery 34 is fixed to an upper surface side or a lower surface side of the main frame 20.

As illustrated in FIG. 1 and FIG. 2, the lawn mower 18 is supported below an intermediate portion in a longitudinal direction of the main frame 20. Thus, the lawn mower 18 is arranged between the caster wheels 15, 16 and the left and right wheels 12, 13 in the front-rear direction. The lawn mower 18 includes three lawn mowing blades 18a, 18b, 18c (FIG. 2) as rotary lawn mowing tools and a mower deck 19 for covering those blades. Each of the lawn mowing blades 18a, 18b, 18c rotates about an axis oriented in the vertical direction (a direction perpendicular to the plane of FIG. 2) to mow lawn. As the power sources of the three lawn mowing blades 18a, 18b, 18c, the three deck motors 63, which are the work motors, are disposed on the mower deck 19. Each of the deck motors 63 is configured that the battery 34 is electrically connected thereto via a deck inverter (not illustrated) as an inverter for the respective deck motor 63 and the electric power can thereby be supplied from the battery 34. Each of the deck inverters is drivingly controlled by the controller according to an operation of a deck switch (not illustrated) near the seat 21. Each of the deck motors 63 is thereby driven. Each of the deck motors 63 is a three-phase motor, for example.

The lawn mower, as the rotary lawn mowing tool, may be an electric lawn mowing reel that includes a spiral blade for mowing the lawn or the like, for example, on a work rotational shaft parallel to the ground surface.

Furthermore, each of the two operation levers 22, 23 is configured to be tiltable so as to be opened outward in a vehicle width direction from the upright N position, and this outward tilted position is set as a parking brake position. The two operation levers 22, 23 have a function to instruct actuation of a parking brake when both of the operation levers 22, 23 move to the parking brake positions. A lateral lever pocket is formed continuously to the N position of each of the lever guides 26, 27, and the vehicle can be parked only by outward opening in the vehicle width direction of the two operation levers 22, 23 from upright states of the operation levers 22, 23. Lower end portions of the left and right operation levers 22, 23 are respectively coupled to brake mechanisms 90, which will be described below, in the left and right power transmission units 41, 42 by link mechanisms. When the operation levers 22, 23 are opened outward, the brake mechanisms 90 are actuated to brake both of the left wheel 12 and the right wheel 13 at the same time.

The overall configuration of the vehicle 10 has been described so far. Next, the power transmission units 41, 42 (FIG. 2) mounted on this vehicle 10 will be described. The left power transmission unit 41, to which the left wheel 12 is connected, and the right power transmission unit 42, to which the right wheel 13 is connected, have the same structure except for being symmetrical about the center in the vehicle width direction. Thus, a detailed description will hereinafter be made on the left power transmission unit 41. Hereinafter, the left travel motor 30 is described as the travel motor 30.

Figure 3:
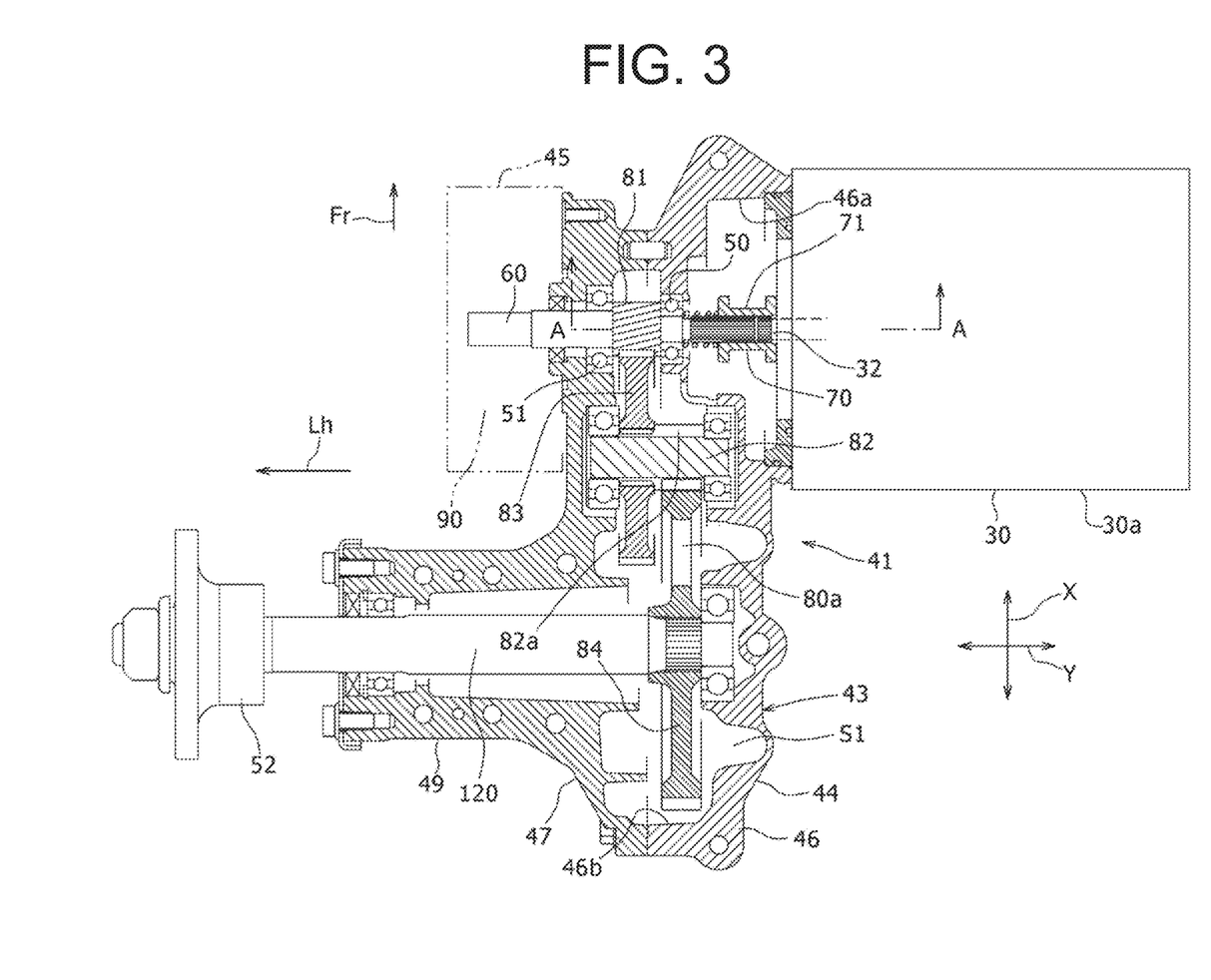
FIG. 3 is a transverse cross-sectional view of a left power transmission unit illustrated in FIG. 2.
Figure 4A:
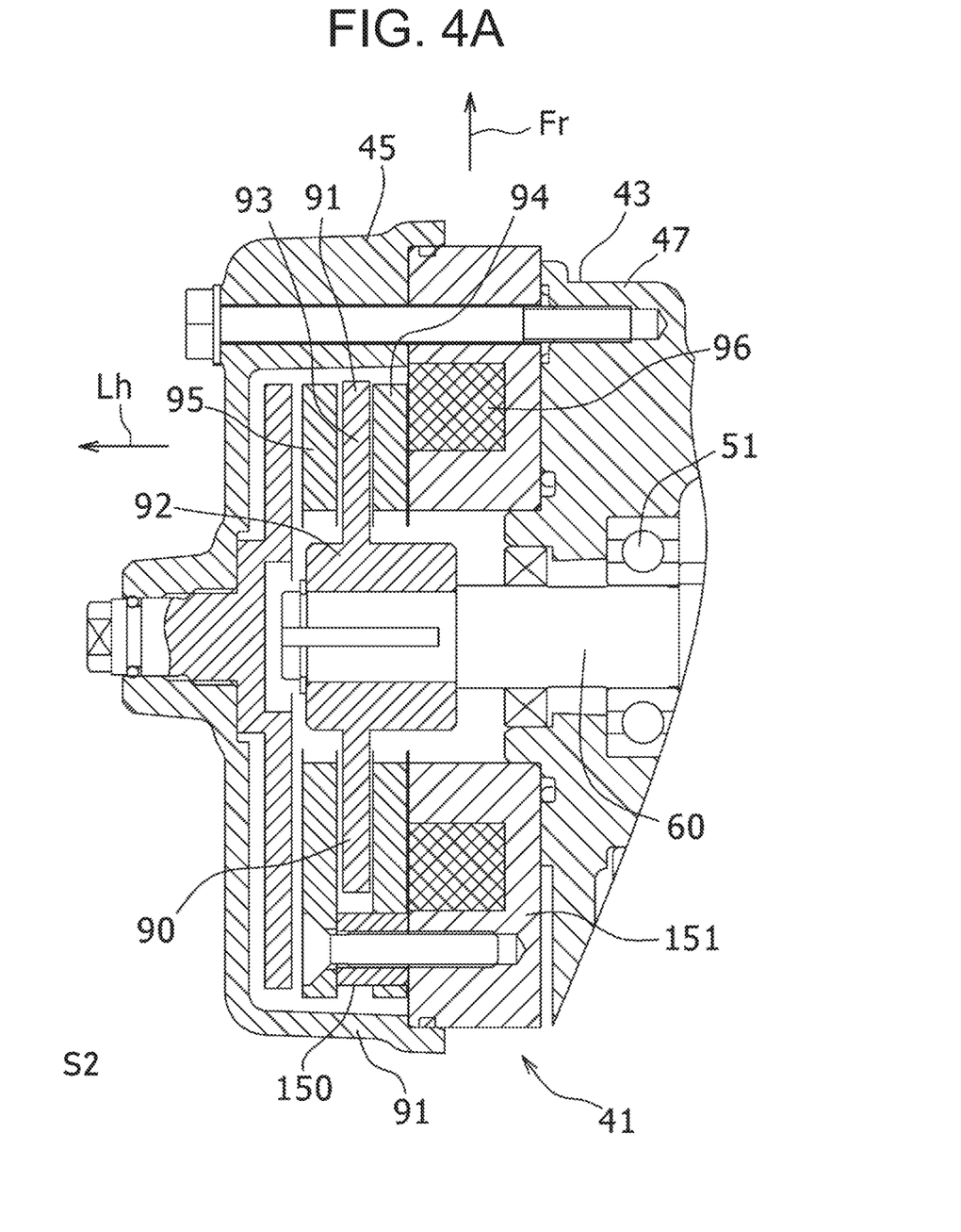
FIG. 4A is a transverse cross-sectional view of a brake mechanism in the power transmission unit in FIG. 3.

FIG. 3 is a transverse cross-sectional view of the left power transmission unit 41. FIG. 4A is a transverse cross-sectional view of the brake mechanism 90 in the power transmission unit 41. The power transmission unit 41 is formed by integrally assembling a case 43, the travel motor 30, the gear mechanism 80a, the axle 120, and the brake mechanism 90. The case 43 is formed by combining a transmission case 44 and a brake case 45. In FIG. 3, the brake mechanism 90 is not illustrated in detail.

An input shaft 60, the axle 120, the gear mechanism 80a, and lubricant are accommodated in the transmission case 44. The gear mechanism 80a is a mechanism that transmits the power between the input shaft 60 and the axle 120 at a predetermined reduction ratio. The input shaft 60 is arranged in parallel with the axle 120 and extends to the outside of the transmission case 44 for mechanical connection with the external power source. In the present embodiment, the power source is the electric travel motor 30.

The travel motor 30 includes a motor shaft 32 that corresponds to a rotational shaft of the power source. The travel motor 30 includes a motor rotor that is fixed to an outer circumferential surface of the motor shaft 32, a stator core that opposes to an outer circumferential surface of the motor rotor, and a three-phase stator coil that is wound around the stator core. The motor rotor has permanent magnets that are arranged at plural circumferential positions on a rotor core, for example. The stator core is fixed to an inner side of a motor case 30a. The motor shaft 32 is rotatably supported on the motor case 30a by a bearing (not illustrated). When three-phase alternating-current power is supplied to the stator coil from the battery, the motor shaft 32 rotates by interaction between a rotating magnetic field generated in the stator core and a magnetic field generated by the motor rotor.

The transmission case 44 is integrated by causing a first case 46 and a second case 47 to overlap each other and joining the first case 46 and the second case 47 by plural bolts. The first case 46 forms an inner end surface in the vehicle width direction as one side in an axial direction (a right side of the sheet of FIG. 3), and the second case 47 forms an outer end surface in the vehicle width direction as the other side in the axial direction (a left side of the sheet of FIG. 3). Here, the axial direction of the power transmission unit 41 is a parallel direction to rotation axes of the input shaft 60 and the axle 120 and matches the vehicle width direction.

The first case 46 is a half case portion having an opening 46b that is opened from a front side to a rear side on an outer end surface in the vehicle width direction. The second case 47 is a half case portion having an opening that is opened from a front side to a rear side in an inner end portion in the vehicle width direction. The first case 46 and the second case 47 are joined to each other such that the openings thereof abut each other. In this way, the opening 46b on the outer side in the vehicle width direction of the first case 46 is closed by the second case 47. As a result, a gear chamber S1 in which each gear of the gear mechanism 80a is arranged is formed in the transmission case 44. Positions on first end side and the second end side of the input shaft 60 across a helical small-diameter gear 81, which is provided in an intermediate portion in the axial direction of the input shaft 60, are rotatably supported via a bearing 50 held on an inner wall of the first case 46 and a bearing 51 held on an inner wall of the second case 47.

The second case 47 further includes a cylindrical section 49 that extends axially outward from a rear portion of an outer surface in the vehicle width direction. The axle 120 is supported to be accommodated in this cylindrical section 49, and a hub 52 is fixed to a portion of the axle 120 that penetrates the cylindrical section 49. The wheel 12 is fixed to the hub 52.

As illustrated in FIG. 3, the first case 46 has a motor attachment opening 46a in a front portion of an inner end surface in the vehicle width direction, and a first end of the input shaft 60 that extends outward from the first case 46 is located at a center of the motor attachment opening 46a. When the travel motor 30 is attached to the inner end surface in the vehicle width direction of the first case 46, the motor attachment opening 46a is sealed in an oil-tight state. The motor shaft 32 of the travel motor 30 is arranged coaxially with the input shaft 60.

A male spline is engraved on the first end of the input shaft 60 that is located in the motor attachment opening 46a. A clutch sleeve 71 constituting a clutch 70 described below is provided with a female spline, which corresponds to the male spline, in a shaft hole thereof. By fitting the clutch sleeve 71 onto the first end of the input shaft 60, the clutch sleeve 71 is engaged with the input shaft 60 in a manner to prevent relative rotation to the input shaft 60 and be freely slidable in the axial direction. An outer circumference at an end of the motor shaft 32 that opposes the first end of the input shaft 60 is formed with a male spline having the same shape as the male spline on the outer circumference of the input shaft 60 described above. In this way, it is configured that the clutch sleeve 71 can be located can be located across the input shaft 60 and the motor shaft 32 beyond an end surface of the first end of the input shaft 60. Since the clutch sleeve 71 is provided across both of the shafts 60, 32, the motor shaft 32 and the input shaft 60 are mechanically coupled via the male spline and the female spline.

A portion of the input shaft 60 extending outward from an outer end surface in the vehicle width direction of the second case 47 is a second end of the input shaft 60. At this second end, a brake rotor 91 (FIG. 4A) that constitutes the brake mechanism 90 described below is provided in a manner to prevent relative rotation. The brake case 45 is joined to the outer surface in the vehicle width direction of the second case 47 by plural bolts in a manner to cover the second end of the input shaft 60 and the brake rotor 91. In this way, a brake chamber S2 (FIG. 4A) is formed in the brake case 45. A brake system formed in the brake chamber S2 will be described below.

As described above, when the motor shaft 32 of the travel motor 30 is connected to the first end of the input shaft 60 via the clutch sleeve 71, the power of the travel motor 30 is introduced to the input shaft 60, reduced in speed by the gear mechanism 80a, and transmitted to the axle 120.

Consequently, the wheel 12 rotates. Thus, when the travel motor 30 is driven, rotation thereof is transmitted from the motor shaft 32 to the input shaft 60, the gear mechanism 80a, and the axle 120 in this order.

The gear mechanism 80a includes: a helical small-diameter gear 81 directly engraved on a center side in the axial direction of the input shaft 60; an intermediate gear shaft 82 arranged between the input shaft 60 and the axle 120, having a helical large-diameter gear 83 locked to one side in the axial direction, and having a small-diameter pinion 82a engraved on the other side; and a final gear 84 fixed to the axle 120. The helical large-diameter gear 83 meshes with the helical small-diameter gear 81, and the final gear 84 meshes with the small-diameter pinion 82a. In this way, a two-stage reduction mechanism is configured. A rotation center hole of the helical large-diameter gear 83 has internal teeth, and root portions of the teeth of the small-diameter pinion 82a mesh with a portion extending to one side in the axial direction. In this way, the helical large-diameter gear 83 and the small-diameter pinion 82a are integrated in a manner to prevent relative rotation to each other. The intermediate gear shaft 82 and the axle 120 are rotatably supported to the inner side of the transmission case 44 via bearings. The helical small-diameter gear 81 corresponds to an input gear section. The final gear 84 corresponds to an axle gear section provided on the axle 120.

Figure 5:
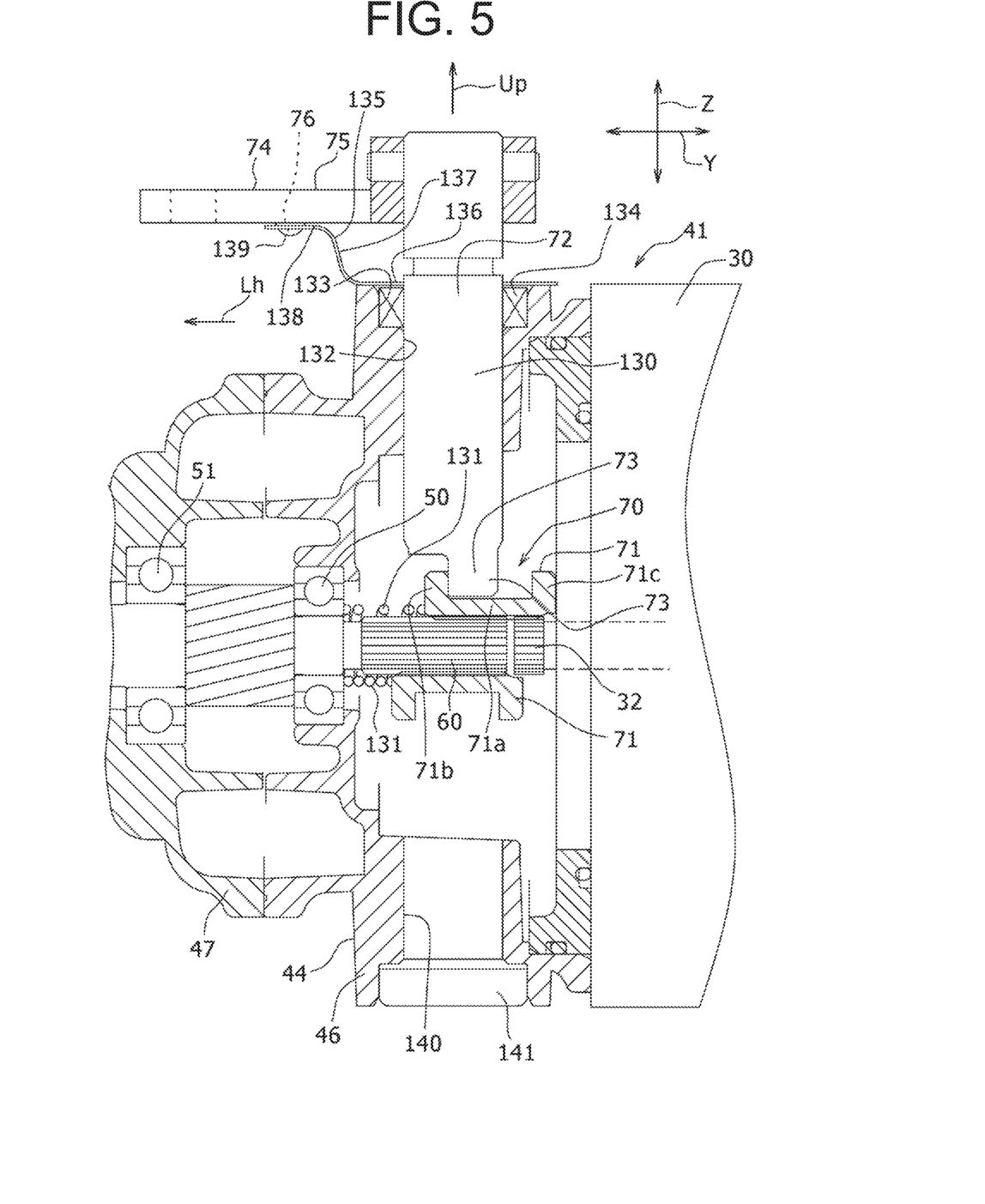
FIG. 5 is an enlarged cross-sectional view that is taken along A-A in FIG. 3.
Figure 6A:
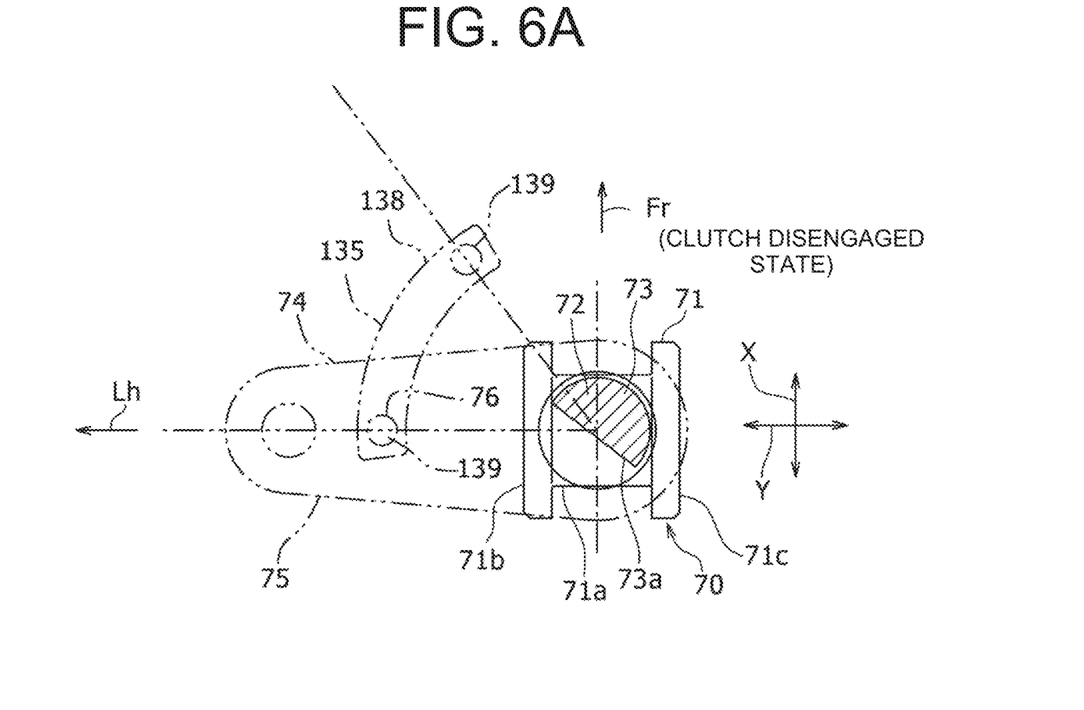
FIG. 6A and FIG. 6B illustrate movement of a clutch sleeve and a cam section of a clutch shaft at a clutch disengaged position FIG. 6A and a clutch engaged position FIG. 6B.
Figure 6B:
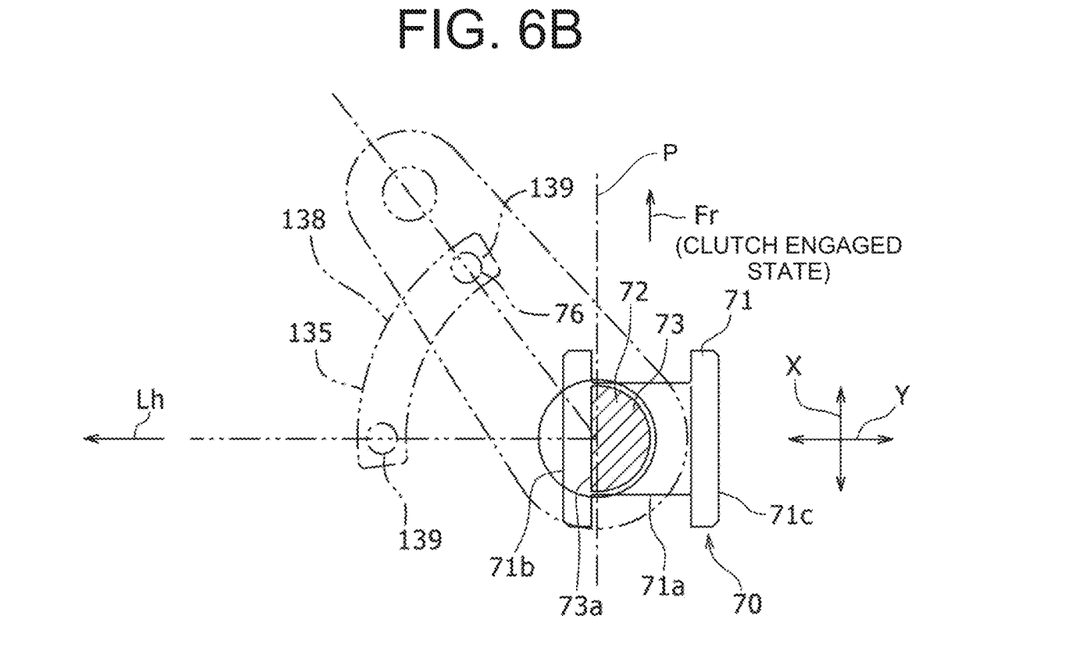

A description will be made on the embodiment according to a configuration of the clutch 70 and the clutch operation mechanism with reference to FIG. 5 and FIG. 6A and FIG. 6B. FIG. 5 is an enlarged cross-sectional view taken along A-A in FIG. 3. FIG. 6A and FIG. 6B illustrate movement of a clutch sleeve 71 and a cam section 73 of a clutch shaft 72 at a disengaged position FIG. 6A of the clutch 70 and an engaged position FIG. 6B of the clutch 70.

The clutch 70 is a traction clutch that is provided between the motor shaft 32 and the input shaft 60 and can manually switch engagement and disengagement between the motor shaft 32 and the input shaft 60. More specifically, the clutch 70 includes the clutch sleeve 71 fitted to the input shaft 60 and a shift mechanism 130. The shift mechanism 130 is configured to cause axial movement of the clutch sleeve 71 according to the user's operation and be able to hold the clutch sleeve 71 at an engaged position or a disengaged position.

More specifically, the shift mechanism 130 includes an elastic member 131, a clutch lever 74, and the clutch shaft 72 that is fixed to the clutch lever 74 and extends in the up-down direction. The clutch sleeve 71 integrally has: a cylindrical section 71a that has a cylindrical shape as a whole; and a pair of flanges 71b, 71c that protrudes radially outward from outer circumferential surfaces at both axial ends of the cylindrical section 71a with a predetermined space being interposed therebetween. A female spline is engaged on an inner diameter hole of the cylindrical section 71a. The female spline cannot rotate relative to the male spline engraved on the input shaft 60 and is engaged with the male spline in a manner to be relatively displaceable in the axial direction. Instead of the male and female splines, a key and a key groove may be used to engage the input shaft 60 and the clutch sleeve 71.

In FIG. 5, the clutch sleeve 71, which is slidingly operated on the input shaft 60, is virtually divided into an upper half and a lower half at different positions for convenience of description.

The upper half of the clutch sleeve 71 in FIG. 5 illustrates the clutch engaged position near the travel motor 30. At the clutch engaged position, the female spline on the inner side of the cylindrical section 71a of the clutch sleeve 71 is engaged with the male spline of the motor shaft 32 while meshing with the male spline of the input shaft 60. Thus, the motor shaft 32 causes synchronous rotation of the input shaft 60.

The lower half of the clutch sleeve 71 in FIG. 5 illustrates the clutch disengaged position away from the travel motor 30. At the clutch disengaged position, the female spline on the inner side of the cylindrical section 71a of the clutch sleeve 71 is engaged with the male spline of the motor shaft 32 while meshing with the male spline of the input shaft 60. Thus, the input shaft 60 and the motor shaft 32 are disengaged.

The elastic member 131 is a compression coil spring and is arranged between an axial end surface of an inner ring of the bearing 50 for supporting the input shaft 60 and an axial end surface of the flange 71b of the clutch sleeve 71. As a result, the clutch sleeve 71 moves toward the travel motor 30, and the clutch sleeve 71 is always urged to the engaged position unless an external force is applied to the clutch sleeve 71.

In the above embodiment, the description has been made on the case where the clutch sleeve 71 is configured to be axially movable between the clutch engaged position, at which the clutch sleeve 71 is installed across the motor shaft 32 and the input shaft 60, and the clutch disengaged position, at which the clutch sleeve 71 in a state of being installed only on the input shaft 60 is disengaged from the motor shaft 32.

Although not illustrated, the clutch sleeve 71 may be configured to be axially movable between the above clutch engaged position and the clutch disengaged position, at which the clutch sleeve 71 in a state of being located only on the motor shaft 32 is disengaged from the input shaft 60. In this case, regardless of whether the clutch sleeve 71 is located at the engaged position or the disengaged position, the clutch sleeve 71 is always engaged with the motor shaft 32 in the manner to be freely and axially movable and prevent relative rotation thereto. In addition, the elastic member may be configured to be arranged between the motor shaft 32 and the clutch sleeve 71 so as to urge the clutch sleeve 71 toward the engaged position.

In the first case 46 of the transmission case 44, through-holes 132, 140, each of which penetrates the first case 46 in the up-down direction, are respectively formed at positions orthogonal to the input shaft 60 on an upper wall surface and a lower wall surface of the first case 46. A large-diameter portion 133 having a larger inner diameter than the other portions is provided at an opening outer end of each of the through-holes 132, 140. A seal ring 134 is fitted to the large-diameter portion 133 continuous with the through-hole 132, and a lid is fitted to the large-diameter portion 133 continuous with the through-hole 140.

The clutch shaft 72 that slidingly operates the clutch sleeve 71 in the axial direction is fitted into and supported by the through-hole 132 in a freely rotatable manner. The clutch lever 74 is fixed to a portion that protrudes outward from an upper end of the through-hole 132. Since a periphery of an outer circumferential surface of the clutch shaft 72, which protrudes outward from the through-hole 132, is sealed by the seal ring 134 held by the large-diameter portion 133, entry of a foreign matter such as water into the first case 46 is prevented.

As illustrated in FIG. 5, the transmission case 44 (the first case 46 and the second case 47) is symmetrical about the input shaft 60 in the up-down direction. Thus, when being turned upside down, the single transmission case 44 can be used in common for the right wheel and the left wheel. FIG. 3 and FIG. 5 illustrate the transmission case 44 for the left wheel. When this transmission case 44 is used for the right wheel, a seal plug 141 is attached to an opening end of the through-hole 132, which is directed downward, for sealing, and the clutch shaft 72 is supported by the through-hole 140 directed upward.

As illustrated in FIG. 6A and FIG. 6B, the clutch lever 74 has a plate-like arm section 75 in a substantially oval shape, a width of which is reduced toward a tip when seen from above. The clutch shaft 72 is fixed to the clutch lever 74 in a state of penetrating a lever hole, which is formed in a base end of the clutch lever 74, in the up-down direction. As illustrated in FIG. 5, a substantially hemispherical projection 76 protrudes from a lower surface of the arm section 75 of the clutch lever 74 in an intermediate portion in the longitudinal direction.

A detent member 135 made of a metal plate is fixed to an upper surface of the first case 46. The detent member 135 includes: a fixed plate section 136 that is fixed along the upper surface of the first case 46; an intermediate plate section 137 that is provided to rise upward from an outer end in the vehicle width direction of the fixed plate section 136; and a locking plate section 138 that is coupled to an upper end of the intermediate plate section 137 and bent to an opposite side from the fixed plate section 136. As illustrated in FIG. 6A and FIG. 6B, a recessed section 139 is formed in the locking plate section 138. When seen from above, the recessed section 139 has an arcuate shape that is along a movement locus of the projection 76 with the clutch shaft 72 being a center, and the recessed section 139 is dented downward in a hemispherical shape at two positions of the projection 76 that correspond to the clutch disengaged position and the clutch engaged position. A hole is formed in the fixed plate section 136, and an upper end of the clutch shaft 72 is rotatably inserted in the hole. When the projection 76 of the clutch lever 74 is fitted into each of the recessed sections 139 of the locking plate section 138, the clutch shaft 72 is restrained at respective one of the two positions (the clutch engaged position and the clutch disengaged position) in the rotational direction. Here, in the detent member 135, a circular through-hole penetrated by the projection 76 may be formed instead of each of the recessed sections 139.

As illustrated in FIG. 6A and FIG. 6B, a cam section 73 is provided at a lower end of the clutch shaft 72 opposing the clutch sleeve 71 in a direction perpendicular to the clutch sleeve 71. As illustrated in FIG. 6B, the cam section 73 is formed by cutting out a left half portion of the clutch shaft 72 on the sheet to have a semicircular cross section that includes a virtual plane P including a rotation center line of the clutch shaft 72. In the present embodiment, an axial distance between the pair of flanges 71b, 71c is set to be approximately equal to a diameter of the clutch shaft 72. The cam section 73 is located in this clearance, and a planar section 73a of the cam section 73 opposes the flange 71b on the elastic member 131 side of the clutch sleeve 71.

As illustrated in FIG. 6A, when the clutch shaft 72 rotates counterclockwise on the sheet, an upper edge of the planar section 73a of the cam section 73 protrudes from the virtual plane P in an Lh direction and pushes the flange 71b of the clutch sleeve 71 in the Lh direction. As a result, the clutch sleeve 71 moves to the position illustrated in the lower half of FIG. 5, and the clutch 70 is located at the disengaged position. Thus, even when the travel motor 30 generates large static torque, such as when the system power supply of the vehicle is turned off to tow the vehicle, the axle 120 can freewheel, and the vehicle can be moved with a small force. At this time, since the outer circumferential surface (including the edge) of the clutch shaft 72 is in contact with both of the paired flanges 71b, 71c without a clearance, the clutch sleeve 71 is restrained so as not to move in the axial direction and maintain the disengaged position.

Meanwhile, the following case is considered. The clutch shaft 72 rotates clockwise as illustrated in FIG. 6B, and the planar section 73a of the cam section 73 thereof is directed parallel to an inner surface of the flange 71b of the clutch sleeve 71. In this case, an urging force of the elastic member 131, which is applied to the clutch sleeve 71, attempts to cause the clutch shaft 72 to rotate clockwise via an edge of the cam section 73, which is in contact with the flange 71b. When the planar section 73a of the cam section 73 is eventually positioned on the same plane as the virtual plane P, the clutch sleeve 71 is located at the position in the upper half of FIG. 5, that is, the clutch engaged position, and the motor shaft 32 is mechanically coupled to the axle 120 via the input shaft 60. When the detent member 135 is unexpectedly unrestrained from the clutch shaft 72, the clutch sleeve 71 always returns to the clutch engaged position by the urging force of the elastic member 131. Thus, failure of freewheeling by the static torque of the travel motor 30 is prevented.

In the vehicle, a clutch operation section (not illustrated) for instructing switching between the engagement and disengagement of the clutch 70 is provided around the seat 21. The clutch operation section is coupled to a link or a cable that is joined to a distal end of the arm section 75 of the clutch lever 74. Accordingly, the link or the cable is pushed or pulled by an operation of the clutch operation section, and the clutch lever 74 is configured to be freely rotatable in one direction and the other direction within a range of about 90 degrees in the present embodiment. In this way, with the user's operation, the clutch sleeve 71 can move in the axial direction between the engaged position and the disengaged position of the clutch 70.

In the present embodiment, the clutch 70 is provided between the input shaft 60 of the gear mechanism 80a and the travel motor 30, and no clutch is provided in the power transmission member from the input shaft 60 to the axle 120. By providing the brake system including the brake mechanisms 90, 90a on the input shaft 60, which is located at the uppermost stream position among the power transmission members in terms of power transmission, the wheel 12, 13 can be braked regardless of whether the clutch 70 is engaged or disengaged by setting capacity of the brake system to be small and operating the brake system.

Next, the brake mechanism 90 is described with reference to FIG. 4A. FIG. 4A is a transverse cross-sectional view of the brake mechanism 90 in the power transmission unit 41. The brake rotor 91 includes: a cylindrical section 92 that is fitted to the input shaft 60; and a disc-shaped rotor body 93 formed in an intermediate portion of an outer circumferential surface of the cylindrical section 92. For example, a female spline section is formed on an inner circumferential surface of the cylindrical section 92, and the female spline section of the cylindrical section 92 is engaged with a male spline section that is formed on the outer circumferential surface at the second end of the input shaft 60. In this way, the brake rotor 91 rotates in synchronization with the input shaft 60.

The brake mechanism 90 is of an electromagnetic type that performs braking action by electromagnetic attraction of a coil as an electromagnetic solenoid. More specifically, the brake mechanism 90 includes the brake rotor 91 described above and an armature 94, a brake plate 95, and a coil 96 that are arranged on both sides of the rotor body 93. In FIG. 4A, the coil 96 is illustrated in a simplified manner by a diagonal lattice portion.

The armature 94 opposes the coil 96. The armature 94 and the brake plate 95 are engaged with a cylindrical fitting section 150 at plural circumferential positions in a manner to be axially movable and to prevent movement in the rotational direction. The fitting section 150 is fixed to a holding block 151 that holds the coil 96. The holding block 151 is fixed in a state of being sandwiched between the brake case 45 and the outer end in the vehicle width direction of the second case 47. In this way, the armature 94 is supported by the brake case 45 and the second case 47 in a manner to be freely slidable in the axial direction and non-rotatable.

The coil 96 can attract the armature 94 when being energized. A spring (not illustrated) is provided between the holding block 151 and the armature 94 such that the armature 94 cooperates with the brake plate 95 to sandwich and press the rotor body 93 when the coil 96 is not energized.

When the two operation levers 22, 23 are located at positions other than the parking brake positions, the controller supplies the electric power from the battery 34 (FIG. 2) to the coil 96. In this way, the armature 94 is attracted against the urging force of the spring to cancel braking of the rotor body 93. As a result, the input shaft 60 becomes free to allow the travel of the vehicle. When the electric power supply from the battery 34 to the coil 96 is interrupted, for example, due to the operation of the two operation levers 22, 23 to the parking brake positions or turning off of a main switch (not illustrated) that turns on a system power supply of the vehicle, the armature 94 is pressed against the rotor body 93 by the urging force of the spring. As a result, the rotor body 93 is sandwiched between the armature 94 and the brake plate 95. Thus, the input shaft 60 is braked, and accordingly, the power transmission members up to the wheels 12, 13 are braked.

Figure 4B:
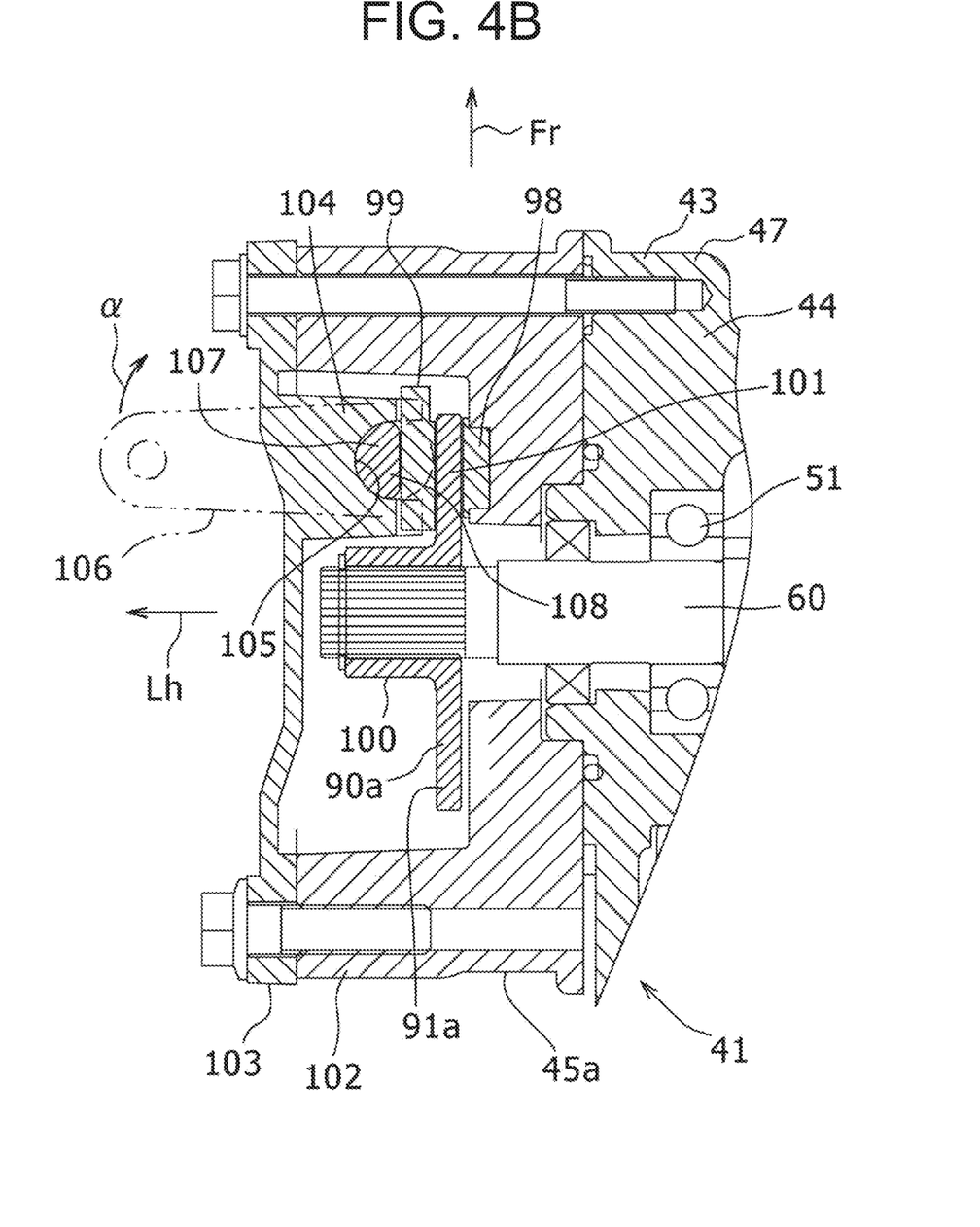
FIG. 4B is a transverse cross-sectional view of another example of the brake mechanism in the power transmission unit in FIG. 3.

Instead of being of the electromagnetic type described above, the brake mechanism 90 may be of a mechanical type. FIG. 4B is a transverse cross-sectional view of another example of the brake mechanism in the power transmission unit 41. More specifically, a brake mechanism 90a in the other example is configured to include: a brake rotor 91a that is fixed to rotate in synchronization with the input shaft 60; and a brake pad 98 and a brake shoe 99 on both sides of a brake rotor 91a.

The brake rotor 91a is formed with a rotor body 101 at one end of an outer circumferential surface of a cylindrical section 100. More specifically, a brake case 45a that covers the brake rotor 91a is configured to include a case body 102 and a cover 103. In the case body 102, the brake pad 98 is held in a portion that opposes one side surface (a right surface in FIG. 4B) of the rotor body 101.

In the cover 103, a projection 104 is formed in a portion that opposes an outer surface (a left surface in FIG. 4B) of the rotor body 101, and a groove section 105 that has a concave semicircular cross section and extends in the up-down direction is formed at a tip of the projection 104. A cam section 108 that has a convex semicircular cross section and includes an arcuate surface and a flat surface on an outer periphery is provided on a brake shaft 107 that is provided in a rotation base section of a brake lever 106 and extends in the up-down direction. The outer arcuate surface of this cam section 108 is inserted in the groove section 105 in a manner to be slidingly guided therein. The brake shoe 99 is arranged between the flat surface of this cam section 108 and an outer surface of the rotor body 101. The brake shoe 99 is supported by the tip of the projection 104 in a manner to be freely movable along the axial direction of the input shaft 60 and not to rotate together with the rotor body 101.

When the two operation levers 22, 23 are operated to the parking brake positions, the left and right brake levers 106 rotate in an arrow a direction in FIG. 5B from a state in FIG. 4B by mechanical brake links (not illustrated). Accordingly, when the brake shaft 107 and the cam section 108 also rotate, an edge between the arcuate surface and the flat surface of the cam section 108 presses the brake shoe 99 against the rotor body 101. As a result, the rotor body 101 is sandwiched between the brake shoe 99 and the brake pad 98. Thus, the movement of the input shaft 60 is restrained, and the wheels 12, 13 are braked.

Meanwhile, when the two operation levers 22, 23 are operated to positions other than the parking brake positions, the brake lever 106 returns to the position illustrated in FIG. 4B by the brake link. Thus, the edge of the cam section 108 of the brake shaft 107 is separated from the brake shoe 99. As a result, the rotor body 101 becomes free, and braking of the axle 120 (the wheels 12, 13) is canceled.

According to the power transmission units 41, 42 described above, the clutch 70 that can be manually operated to switch the engagement and the disengagement between the motor shaft 32 and the input shaft 60 is provided at the first end of the input shaft 60. The brake mechanisms 90, 90a, each of which includes the brake rotor 91, are provided at the second end of the input shaft 60. Thus, by disengaging the clutch 70, the vehicle can be moved with the small force without resistance when the system power supply is turned off, and the vehicle can be braked by the brake system regardless of whether the clutch 70 is engaged or disengaged. In addition, even in the case where the vehicle starts traveling downward due to a degree of inclination of the road surface after the clutch 70 is set to the clutch disengaged position by the operation of the clutch operation section, the vehicle can be stopped promptly by performing the brake operation. Since the brake mechanisms 90, 90a are installed on the input shaft 60 having the smallest reduction gear ratio, the brake capacity can be small, and the compact power transmission units 41, 42 can be provided.

Here, a brake pedal (not illustrated) operable by the driver's foot may be provided in front of the seat 21 of the vehicle. It may be configured that, when the brake pedal is operated, regenerative braking control is executed in each of the left and right travel motors 30, 31. Alternatively, it may be configured that, when the rotation of each of the travel motors 30, 31 is stopped and thereafter the brake pedal is depressed, the controller stops the electric power supply to the coil 96 and parking braking of the left and right wheels 12, 13 may be performed by the brake mechanisms 90.

Figure 7:
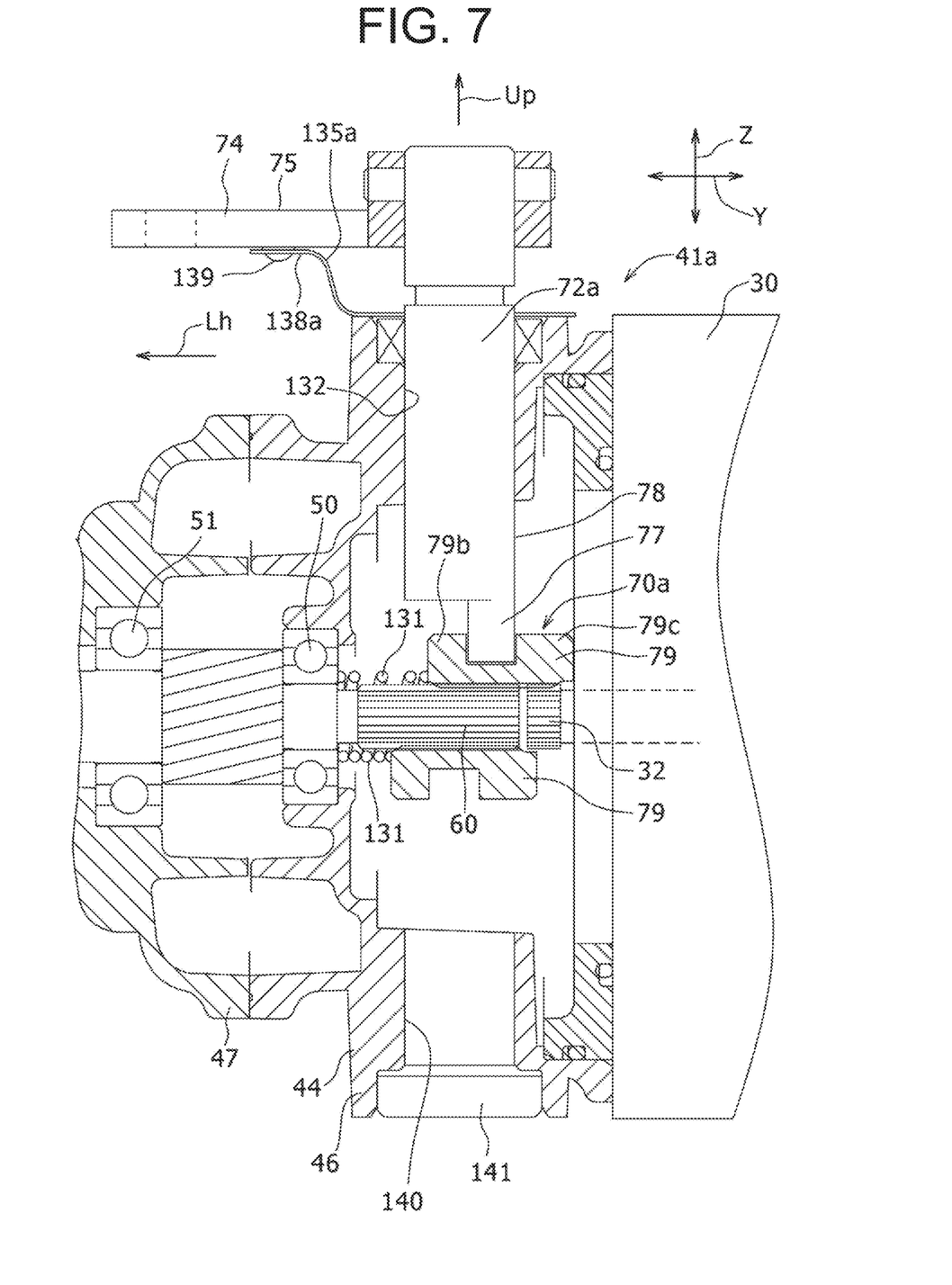
FIG. 7 is a view of a vehicle power transmission unit in another example of the embodiment according to the present invention and corresponds to FIG. 5.
Figure 8A:
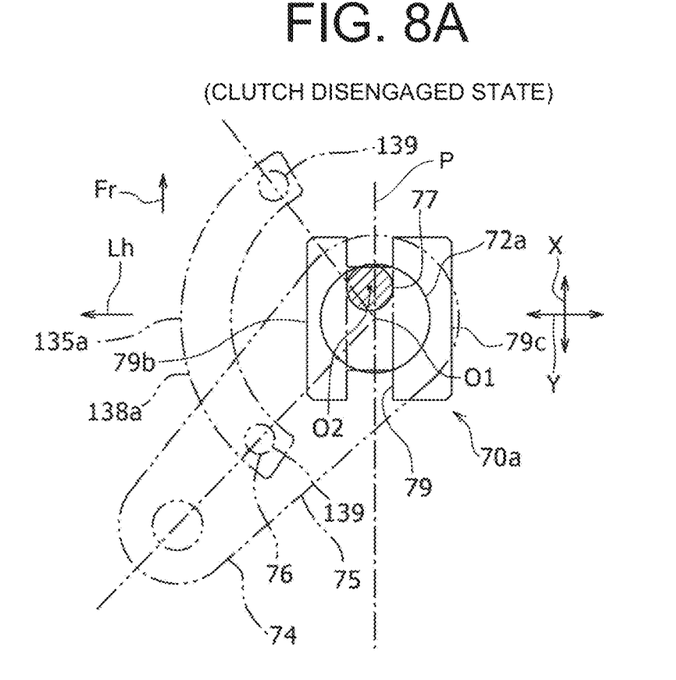
FIG. 8A and FIG. 8B include views illustrating the clutch disengaged position FIG. 8A and the clutch engaged position FIG. 8B in the other example of the embodiment and corresponds to FIG. 6A and FIG. 6B.
Figure 8B:
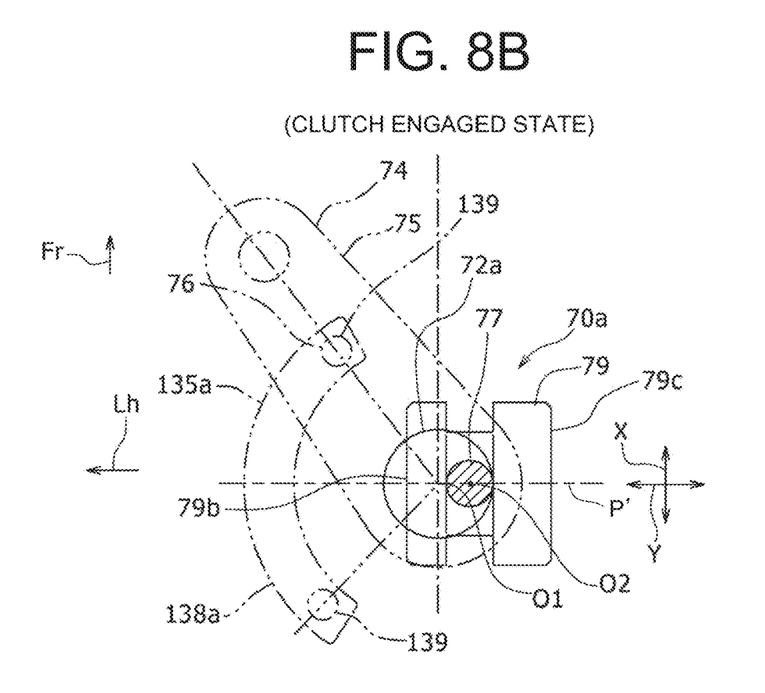

Next, with reference to FIG. 7, a description is made on the power transmission unit 41a, for which another example of the embodiment related to the clutch operation mechanism is adopted. FIG. 8A and FIG. 8B include views illustrating the disengaged position FIG. 8A and the engaged position FIG. 8B of the clutch 70a in the other example of the embodiment.

A configuration in this example differs from the configuration in FIG. 1 to FIG. 6A and FIG. 6B in that an eccentric shaft 77 is provided in a lower end portion of a clutch shaft 72a instead of not providing a cam section having a semicircular cross section in the lower end portion of the clutch shaft 72a. A center O2 of this eccentric shaft 77 is set at a position that is offset from a center O1 (FIG. 8A and FIG. 8B) of the clutch shaft 72a.

A distance between paired flanges 79b, 79c provided in a clutch sleeve 79 substantially matches a diameter of the eccentric shaft 77. Accordingly, the eccentric shaft 77 is fitted to the clutch sleeve 79 in the axial direction without play, and axial displacement of the eccentric shaft 77 is directly transmitted to the clutch sleeve 79. In other words, the clutch sleeve 79 always follows and is restrained by the movement of the eccentric shaft 77.

Similar to FIG. 5 described above, FIG. 7 illustrates the clutch engaged position at which an upper half of the clutch sleeve 79 is located across the input shaft 60 and the motor shaft 32 to couple both of the shafts 60, 32. A lower half of the clutch sleeve 79 illustrates the clutch disengaged position which is located only on the input shaft 60 and at which the motor shaft 32 is disengaged.

Similar to the configuration in FIG. 1 to FIG. 6A and FIG. 6B described above, the elastic member 131 is provided between the input shaft 60 and the clutch sleeve 79 and urges the clutch sleeve 79 to press the clutch sleeve 79 toward the travel motor 30. This urging force assists the user in operating the clutch 70a using the clutch operation section to engage the clutch 70a. Thus, an operation force can be reduced.

FIG. 8A illustrates a state where the clutch shaft 72a is seen from above. FIG. 8A illustrates a state when the clutch lever 74 is operated such that the center O2 of the eccentric shaft 77 is shifted in the front-rear direction (X-direction) from the center O1 of the clutch shaft 72a, more preferably, the center O2 of the eccentric shaft 77 is included in the virtual plane P including the center O1 of the clutch shaft 72a in the front-rear direction. A position of the clutch sleeve 79, which follows the position of the eccentric shaft 77 at this time, is set as the clutch disengaged position.

FIG. 8B also illustrates the state where the clutch shaft 72 seen from above. FIG. 8B illustrates a state when the clutch lever 74 in FIG. 8A is operated clockwise on the sheet such that the center O2 of the eccentric shaft 77 is included in a virtual plane P' in the right-left direction including the center O1 of the clutch shaft 72. At this time, since an offset amount of the center O2 of the eccentric shaft 77 from the center O1 of the clutch shaft 72a is set to a dimension that corresponds to a stroke amount of the clutch sleeve 79 from the clutch disengaged position to the clutch engaged position. Thus, the clutch sleeve 79 that follows the displacement of the eccentric shaft 77 is located at the clutch engaged position. The eccentric shaft 77 restrains the clutch sleeve 79 at the clutch engaged position. Thus, even when the elastic member 131 is broken, and the urging force is no longer applied to the clutch sleeve 79, each of the power transmission units 41, 42 are suppressed from being brought into a freewheeling state without the user's intention.

In the above embodiment, the pair of left and right power transmission units, in which the left and right wheels can be driven independently of each other, the left wheel is driven by the left electric motor, and the right wheel is driven by the right electric motor, has been described. Meanwhile, the present invention can be applied to an input shaft in a power transmission unit in which the left and right wheels are driven by a common electric motor.

In addition, in the above embodiment, the description has been made on the case where the power source is the electric motor. However, the present invention can also be applied to a configuration in which the power source is another drive source such as an internal combustion engine or a hydraulic motor.

REFERENCE SIGNS LIST

10 Vehicle
12 Left wheel
13 Right wheel
15, 16 Caster wheel
18 Lawn mower
18a to 18c Lawn mowing blade
18d Discharge duct
19 Mower deck
20 Main frame
20a, 20b Side plate
20c Coupling section
21 Seat
22, 23 Operation lever
24 Grip section
26, 27 Lever guide
30 Left travel motor
31 Right travel motor
32 Motor
34 Battery
41, 42, 41a Power transmission unit
43 Case
44 Transmission case
45, 45a Brake case
46 First case
47 Second case
49 Cylindrical section
50, 51 Bearing
60 Input shaft
63 Deck motor
70, 70a Clutch
71 Clutch sleeve
72, 72a Clutch shaft
73 Cam section
74 Clutch lever
75 Arm
76 Projection
77 Eccentric shaft
78 Body section
79 Clutch sleeve
80a, 80b Gear mechanism
81 First helical gear
82 Intermediate gear shaft
83 Second helical gear
84 Output gear
90, 90a Brake mechanism
91 Brake rotor
92 Cylindrical section
93 Rotor body
94, 95 Steel plate
96 Coil
97 Catch plate
98 Brake pad
99 Brake shoe
100 Cylindrical section
101 Rotor body
102 First brake case
103 Second brake case
104 Projection
105 Groove
106 Brake lever
107 Brake shaft
108 Cam section
120, 121 Axle
130 Shift mechanism
131 Elastic member
132 Through-hole
133 Large-diameter section
134 Seal member
135 Detent member
140 Second through-hole
141 Plug
150 Fitting section
151 Holding block

The invention claimed is:

1. A vehicle power transmission unit in which power from a power source is sequentially transmitted from a rotational shaft of the power source to an input shaft, a gear mechanism that operatively connects the input shaft and an axle,
the rotational shaft and the input shaft being arranged such that axes match each other, and
the input shaft has a first end and a second end, the vehicle power transmission unit comprising:
a clutch that is provided between the rotational shaft and the first end of the input shaft and can be manually operated to switch between engagement and disengagement of the input shaft; and
a brake mechanism that includes a brake rotor provided not to rotate relative to the second end of the input shaft,
wherein
the clutch includes:
a clutch sleeve that cannot rotate relative to the rotational shaft and the first end of the input shaft and can freely slide in an axial direction, the clutch sleeve being operable to a clutch engaged position, at which the clutch sleeve is fitted across the rotational shaft and the input shaft, and a clutch disengaged position, at which the clutch sleeve is disengaged from one shaft out of the rotational shaft and the input shaft; and
a shift mechanism that causes the clutch sleeve to move in the axial direction in response to a user's operation, the shift mechanism being able to be held at the clutch engaged position or the clutch disengaged position, and
the clutch includes:
an elastic member that is provided between the clutch sleeve and the other shaft out of the rotational shaft and the input shaft and urges the clutch sleeve toward the clutch engaged position.

2. The vehicle power transmission unit according to claim 1, wherein
the shift mechanism restrains axial movement of the clutch sleeve at the clutch engaged position.

3. The vehicle power transmission unit according to claim 1, wherein
The power source is an electric motor.

* * * * *